(12) United States Patent
Hahn (10) Patent No.: US 8,793,901 B2
(45) Date of Patent: Aug. 5, 2014

(54) TRANSPORT- AND DRYING DEVICE FOR INDIVIDUALLY TRANSPORTED ARTICLES AND METHOD FOR DRYING INDIVIDUALLY TRANSPORTED ARTICLES

(75) Inventor: Wolfgang Hahn, Neutraubling (DE)

(73) Assignee: Krones AG, Neutraubling (DE)

( * ) Notice: Subject to any disclaimer, the term of this patent is extended or adjusted under 35 U.S.C. 154(b) by 296 days.

(21) Appl. No.: 12/931,887

(22) Filed: Feb. 14, 2011

(65) Prior Publication Data

US 2011/0203129 A1 Aug. 25, 2011

(30) Foreign Application Priority Data

Feb. 25, 2010 (DE) .......................... 10 2010 000 548

(51) Int. Cl.
| | |
|---|---|
| F26B 3/00 | (2006.01) |
| F26B 25/00 | (2006.01) |
| B65G 17/00 | (2006.01) |
| F26B 21/00 | (2006.01) |
| F26B 15/18 | (2006.01) |
| B65G 21/00 | (2006.01) |

(52) U.S. Cl.
CPC ............. *F26B 15/18* (2013.01); *B65G 2207/26* (2013.01); *F26B 21/004* (2013.01); *B65G 21/00* (2013.01)
USPC ................ 34/500; 34/236; 198/841; 198/793

(58) Field of Classification Search
USPC ............ 34/500, 236; 198/793, 788, 837, 841, 198/860.3, 861.1, 689.1; 193/41
See application file for complete search history.

(56) References Cited

U.S. PATENT DOCUMENTS

| 1,447,494 | A | * | 3/1923 | Strawn ............................. 34/236 |
| 2,501,367 | A | | 3/1950 | Wehmiller et al .............. 15/306 |
| 2,688,394 | A | * | 9/1954 | Hurd et al. ..................... 198/816 |
| 3,405,813 | A | * | 10/1968 | Davis et al. ..................... 414/26 |
| 3,568,238 | A | | 3/1971 | Fischer .......................... 15/306 |
| 3,726,020 | A | * | 4/1973 | Lee, Jr. ........................... 34/439 |
| 4,321,031 | A | * | 3/1982 | Woodgate ...................... 432/11 |
| 4,348,816 | A | * | 9/1982 | Arippol ........................... 34/391 |
| 4,436,200 | A | * | 3/1984 | Hodlewsky et al. .......... 198/851 |
| 4,953,693 | A | * | 9/1990 | Draebel ....................... 198/853 |

(Continued)

FOREIGN PATENT DOCUMENTS

| CN | 2489282 | 5/2002 |
| CN | 1981172 | 6/2007 |

(Continued)

*Primary Examiner* — Kenneth Rinehart
*Assistant Examiner* — John McCormack
(74) *Attorney, Agent, or Firm* — Davidson, Davidson & Kappel, LLC (57) ABSTRACT

A transport- and drying line for individual articles, a grouped plurality of articles and/or a plurality of articles transported in a row and/or side by side, the articles at least partially showing humidity and/or liquid drops on their outer surface. The articles are each standing on a link conveyor in an airflow of drying air. A support plane is at least partially permeable for the drying air flow and flow conducting surfaces are arranged at the lower surface of the support plane for the drainage of the humid drying air carrying the liquid removed from the articles to be dried. A method for transporting and drying of individual articles, a grouped plurality of articles and/or a plurality of articles transported in a row and/or side by side whereby the articles at least partially show humidity and/or liquid drops on their outer surface.

3 Claims, 8 Drawing Sheets

(56) References Cited

U.S. PATENT DOCUMENTS

| | | | |
|---|---|---|---|
| 4,982,836 A * | 1/1991 | Summers | 198/838 |
| 5,937,535 A * | 8/1999 | Hoffman et al. | 34/78 |
| 6,760,981 B2 * | 7/2004 | Leap | 34/210 |
| 7,819,238 B2 * | 10/2010 | Hoover | 198/621.1 |
| 2004/0211652 A1 * | 10/2004 | Abbestam et al. | 198/860.1 |
| 2007/0056612 A1 | 3/2007 | Robert et al. | 134/61 |
| 2007/0193056 A1 * | 8/2007 | Switalski | 34/88 |
| 2007/0256320 A1 | 11/2007 | Pearson | |
| 2008/0222912 A1 * | 9/2008 | Hahn | 34/437 |
| 2008/0276485 A1 * | 11/2008 | Pucciani et al. | 34/500 |
| 2009/0235554 A1 * | 9/2009 | MacNeil | 34/524 |
| 2009/0260953 A1 * | 10/2009 | Frost et al. | 198/500 |
| 2010/0015304 A1 * | 1/2010 | Sauvageau | 426/248 |
| 2011/0120991 A1 * | 5/2011 | Armenta Pitsakis | 219/702 |

FOREIGN PATENT DOCUMENTS

| | | |
|---|---|---|
| DE | 14 04 553 B1 | 7/1970 |
| DE | 21 15 640 | 10/1972 |
| EP | 0072638 A1 | 2/1983 |
| EP | 1 028 300 A1 | 8/2000 |
| EP | 1 357 082 | 10/2003 |
| EP | DE 602 00 934 T2 | 10/2003 |
| GB | 236 936 A | 10/1925 |
| GB | 236936 | 10/1925 |
| GB | 852655 | 10/1960 |

* cited by examiner

Fig. 1a

Fig. 1b (state of the art)

Fig. 1c (state of the art)

Fig. 1d (state of the art)

TRANSPORT- AND DRYING DEVICE FOR INDIVIDUALLY TRANSPORTED ARTICLES AND METHOD FOR DRYING INDIVIDUALLY TRANSPORTED ARTICLES

This claims the benefit of German Patent Application DE 10 2010 000 548.7, filed Feb. 25, 2010 and hereby incorporated by reference herein The present invention relates a transport- and drying device for individually transported articles. The invention furthermore relates to a method for drying individually transported articles.

BACKGROUND

After bottles or other liquid containers are filled with the respective liquid or beverage the containers are usually closed and further processed and handled. One of these subsequent handling stations can comprise a labeling device. The labeling device applies at least one label onto the outer surface area of each container, whereby the label is preferably stuck to the container. Humidity or liquid drops on the outer surface area of the container interfere with the sticking of the labels because they impair the adhesive properties of the sticking label or the glue used. Furthermore liquid drops beneath the label lead to permanent optical impairments, especially as the enclosed liquid volume can usually not be removed after the label is stuck to the container.

Apart from applying labels the bottles or beverage containers can also be imprinted. Optionally the printing can be made directly on already applied labels to complete an existing print. Alternatively known direct printing methods can be used to directly print onto the outer surface area of the container. It is comprehensible that humidity hinders and/or interferes with all known printing methods leading to misprints or bad printing results. Therefore dry container surface areas are important to achieve good printing results.

To avoid the described disadvantages the outer surface area of the containers or bottles are usually dried before labeling. To achieve the desired drying result in a short distance and time, blowing stations are used, whereby a warm airflow is applied onto the container to be dried. Depending on the temperature, the volume flow and the flow velocity of the air the containers can be dried as required in a very short transport distance. Different embodiments of blowing stations are known. The expert in this technical field also knows several possibilities that use a warm air flow to dry containers.

U.S. Pat. No. 2,501,367 A shows a device for drying articles, whereby the articles are moved with the help of a conveyor chain along a flat lying shaft with a screw thread arranged on its outer surface, whereby the shaft is slowly rotating. The shaft has a tread pitch that is tuned to the outer diameter of the articles. This guarantees a suitable division and a regular rotation of the articles during their longitudinal transport, therefore a blow unit located opposite to the shaft ensures a uniform drying of the articles along their whole circumference.

Such drying devices normally show very good drying results. But usually they require a lot of space and reduce the possible machine cycle times because they are relatively slow. Therefore they are not suited to be used with filling devices or other processing machinery that have much higher throughput speeds. Other known drying devices show deficiencies by not removing the humidity completely.

Figure 1A:
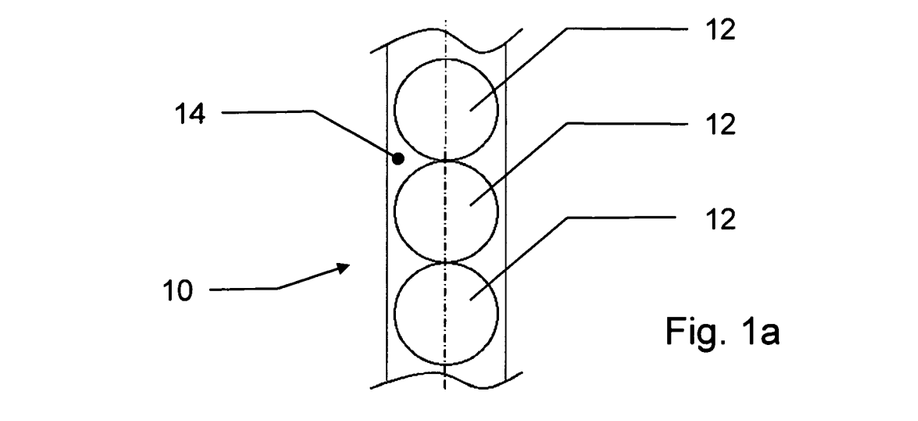
FIGS. 1a, 1b, 1c and 1d show four different views of a transport- and drying device known from the state of the art.
Figure 1B:
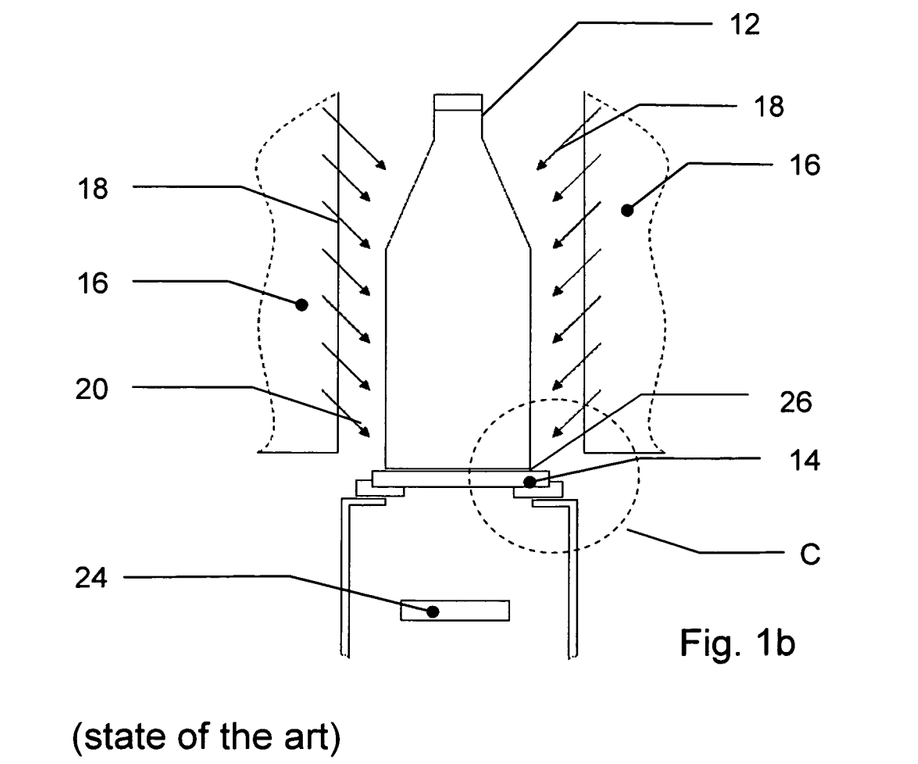
Figure 1C:
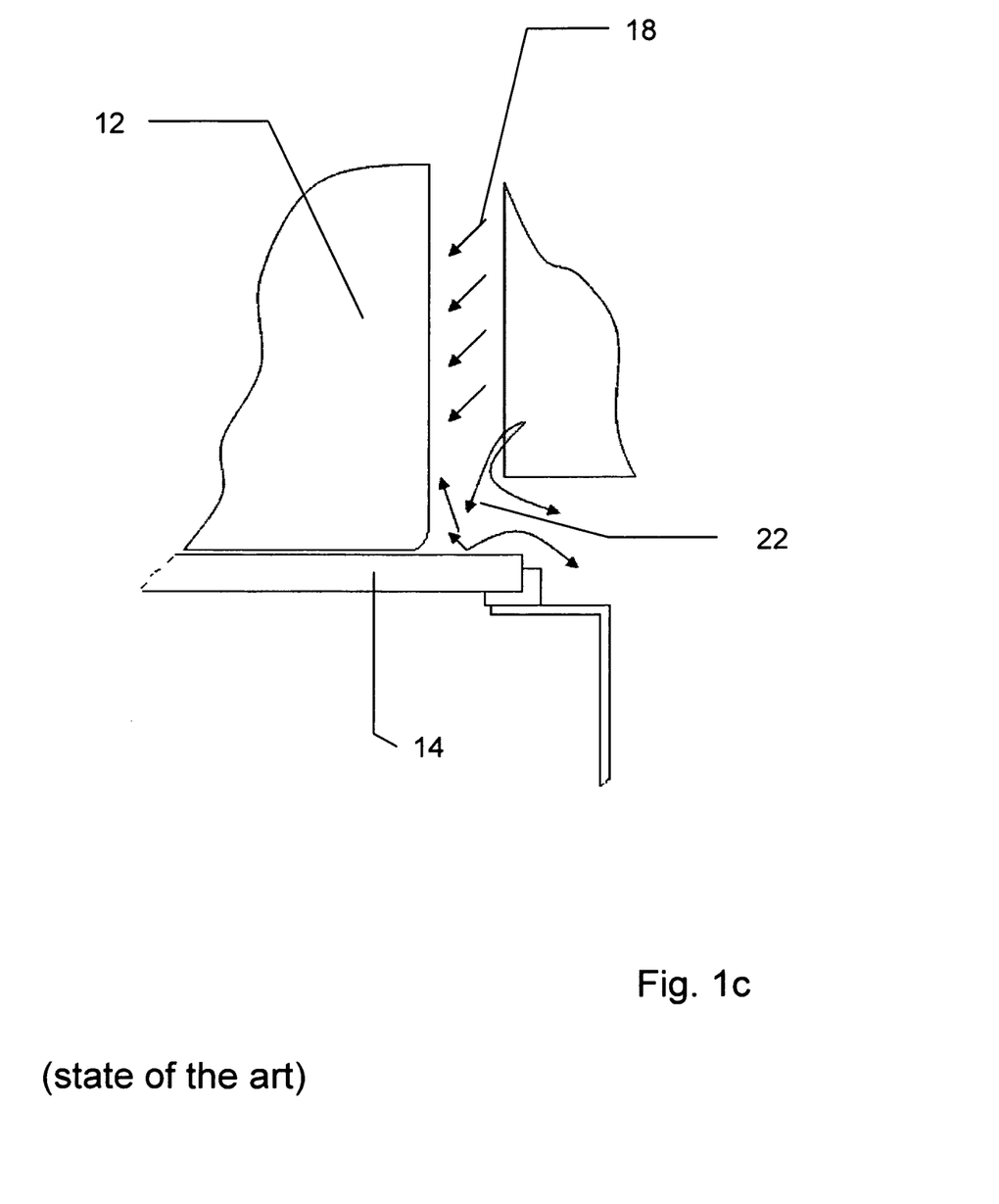
Figure 1D:
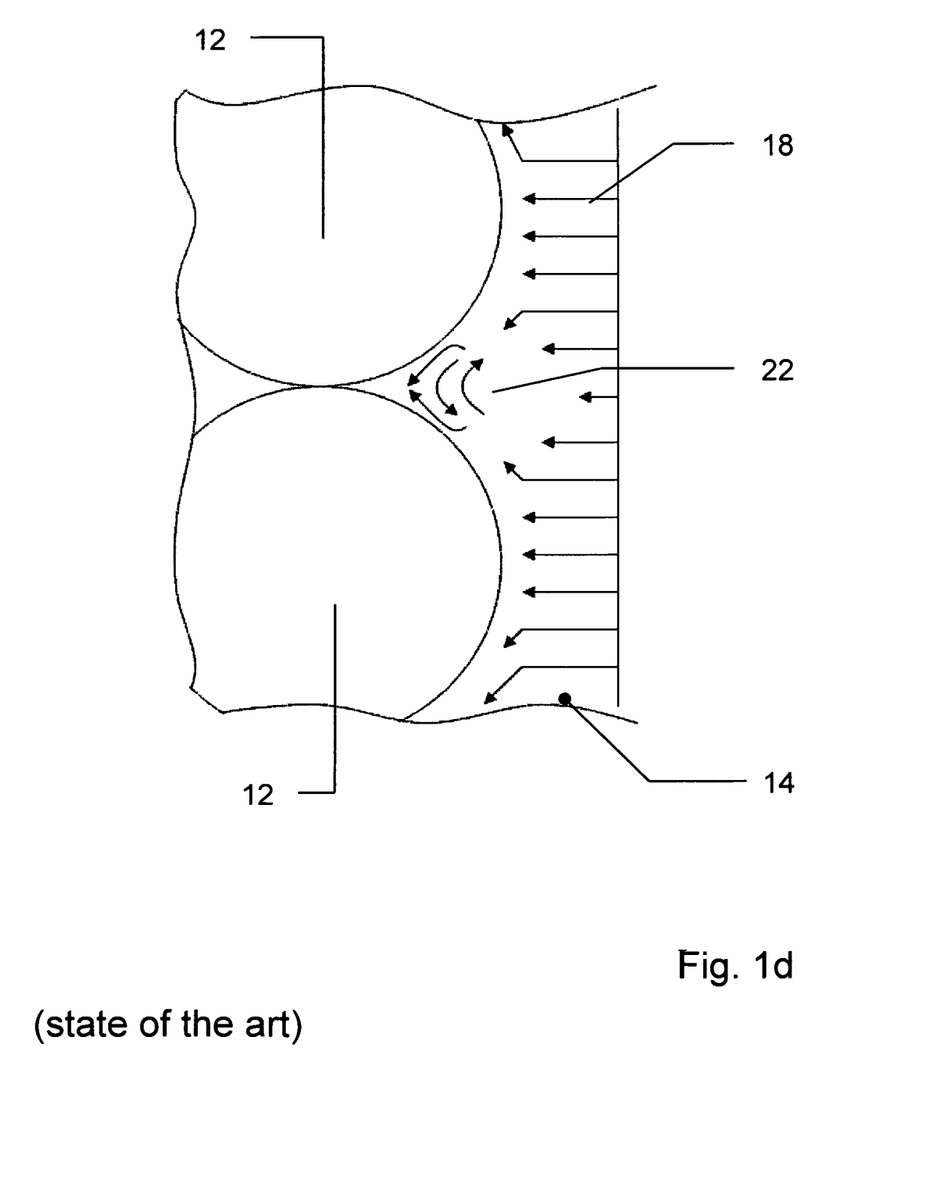

The typical problems of known drying devices are shown in the representations of FIG. 1 (FIG. 1a to 1d). The device according to the known state of the art as represented in FIG. 1a shows a constant line 10 of bottles 12 to be dried. The bottles 12 are standing one directly behind each other without any gap on a conveying chain 14, a conveyor, a mat conveyor or another horizontal conveying device. The bottles 12 are coming from a filling station, are capped and any adhering liquid or humidity should be removed as completely as possible to get the bottles in the best possible condition for the following treatment, especially for a following labeling or printing process or the like. The schematic representation of FIG. 1b shows blowing devices 16 arranged on the left and the right side close to the bottles 12 that are transported in a horizontal direction. The blowing devices 16 can for example be formed by nozzle arrays, flat nozzles or something alike. The air flow 18 coming from the blowing device 16 is usually directed obliquely downwards as pointed out in FIG. 1b by parallel arrows to the right and left of the bottles 12. The representation of FIG. 1c shows an enlarged detail of a section marked with a circle in FIG. 1b. The air flow 18 is swirled around the bottle bottom 20 and at the edge of the conveying chain 14. Thereby adhering humidity and humidity entrained by the air flow 18 is swirled and cannot be completely removed in the downward direction. The swirled air has the reference number 22. As can be seen in the enlarged representation of FIG. 1d, the area showing the highest turbulence is between the containers or bottles 12. The blowing devices 16 are placed close to the conveying chain 14 so that also the lower part of the bottles 12 can be reached by the air flow 18. If the bottles 12 are standing on a normally used bottle transport device, e.g. a modular or linkage belt chain or a strap hinge chain, hereby generally referred to as conveying chain 14, then the lower returning strand 24 of the conveying chain 14 (see FIG. 1 b) can be wetted by the liquid especially by water. This liquid can then be protracted to the upper side 26 of the conveying chain 14 and therefore wet the containers or bottles 12 once more.

SUMMARY OF THE INVENTION

It is an object of the present invention to improve the drying effect for containers and bottles meanwhile ensuring a high transport and drying throughput.

The present invention provides a transport- and drying device for individual articles, a grouped plurality of articles and/or a plurality of articles transported in a row and/or side by side, whereby the articles show at least partially humidity and/or liquid drops on their outer surface. The articles are each standing close to each other or even touching each other on a pushed or pulled link conveyor in an airflow of drying air coming from the lateral sides and/or from above. The link conveyor forms an almost planar, moving support plane for the articles that is at least partially permeable for the drying air flow, whereby the air together with the entrained humidity is drained downwards through the surface of the link conveyor. Furthermore below the link conveyor or at the lower side of the support plane conducting surfaces are placed to drain the humid air carrying the liquid of the articles to be dried. Such an arrangement ensures that almost the whole air channeled downwards is drained together with the contained humidity without any unwanted turbulences in the area of or in between the containers, especially in the range of the container bottom.

According to one preferred embodiment the flow conducting surfaces are part of an enclosure or of a shielding housing for a part of the link conveyor, whereby this part is a part of the link conveyor returning below the support plane for the articles. This so called returning strand of the link conveyor or link chain or the like is at the same time shielded so that it is not exposed to any blown off water or humidity that is carried away by the air flow. Thereby the uptake of dripping water or water thrown upwards and/or residual moisture onto the conveying chain and the transmission to the transported containers can be avoided very efficiently. Preferably the link conveyor is arranged and guided in a way that it is spaced apart from the flow conducting surfaces or enclosure in a defined distance. The blown off air enriched with moisture can in this way flow through the mashes and gaps of the link conveyor and is then drained by the flow conducting surfaces in a suitable manner. The guidance in the required distance can for example be guaranteed by the use of suitable distance elements that are supported on the upper side of the enclosure or on the flow conducting surfaces. The distance elements can for instance be formed by suitable sliding rails, rail systems, guiding elements or the like that allow a sliding of the conveying chain with almost no frictional resistance.

According to another embodiment of the invention the enclosure shows a roof shaped upper side, whereby the surfaces inclining downwards function as flow conducting surfaces and as support surfaces for the distance elements carrying the link conveyor as well. The roof shaped upper side of the enclosure preferably comprises at least one guide rail supported by the distance elements. Basically the roof shaped upper side of the enclosure can be sloped or inclined so that drainage of the air essentially occurs at the sloping side. Another symmetric embodiment shows a ridge or bend in the middle and flow conducting surfaces laterally sloping downwards thereby ensuring an almost regular distribution of the air flow to both sides of the conveyor chain.

The support of the conveying chain on the inclining, curved and/or inclining flow conducting surfaces can be made by suitable distance elements, optionally with suitable sliding rails that form a support for the enclosure and at the same time ensure the necessary permeability for the airflow that is conducted downwards. The sliding rails are straight or meandering in longitudinal direction, whereby the sliding rails can optionally be interrupted at multiple and/or regular distances in transverse direction thereby not hindering the drainage of the humidity or the downwards flow of the air. The at least one sliding rail carries the conveying chain and at the same time forms the distance elements or is part of the distance elements.

The invention furthermore comprises a method for transporting and drying of individual articles, a grouped plurality of articles and/or a plurality of articles transported in a row and/or side by side whereby the articles show at least partially humidity and/or liquid drops on their outer surface. The articles are each standing close to each other or even touching each other on a pushed or pulled link conveyor in an airflow of drying air coming from the lateral sides and/or from above. The link conveyor forms an almost planar, moving support plane for the articles that is at least partially permeable for the drying air flow, whereby the air together with the entrained humidity is drained downwards through the surface of the link conveyor. One embodiment of the method includes that the humid air carrying the liquid from the articles to be dried is specifically drained below the link conveyor by a roof shaped enclosure functioning as flow conducting surfaces for the returning strand of the link conveyor.

BRIEF DESCRIPTION OF THE DRAWINGS

Further features and advantages of the present invention shall now be described in greater detail according to the accompanying figures in the following detailed description. The dimensions of the individual elements to each other do not always correspond with the real dimensions since some forms are shown simplified and other forms are shown enlarged with respect to other elements for the sake of clarity.

DETAILED DESCRIPTION

Figure 2A:
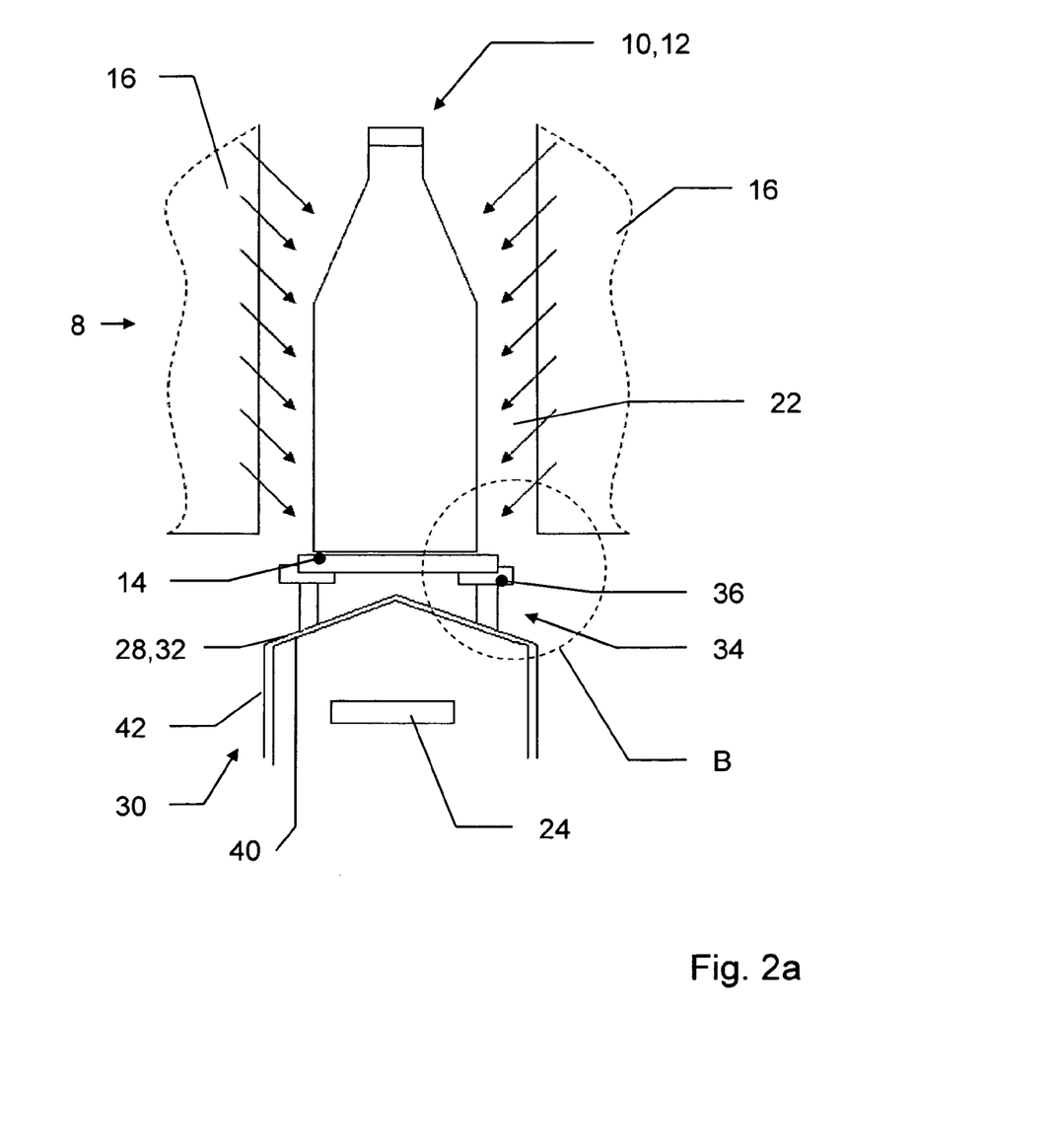
FIGS. 2a, 2b and 2c show three different views of a first embodiment of a transport- and drying device according to the invention.
Figure 2B:
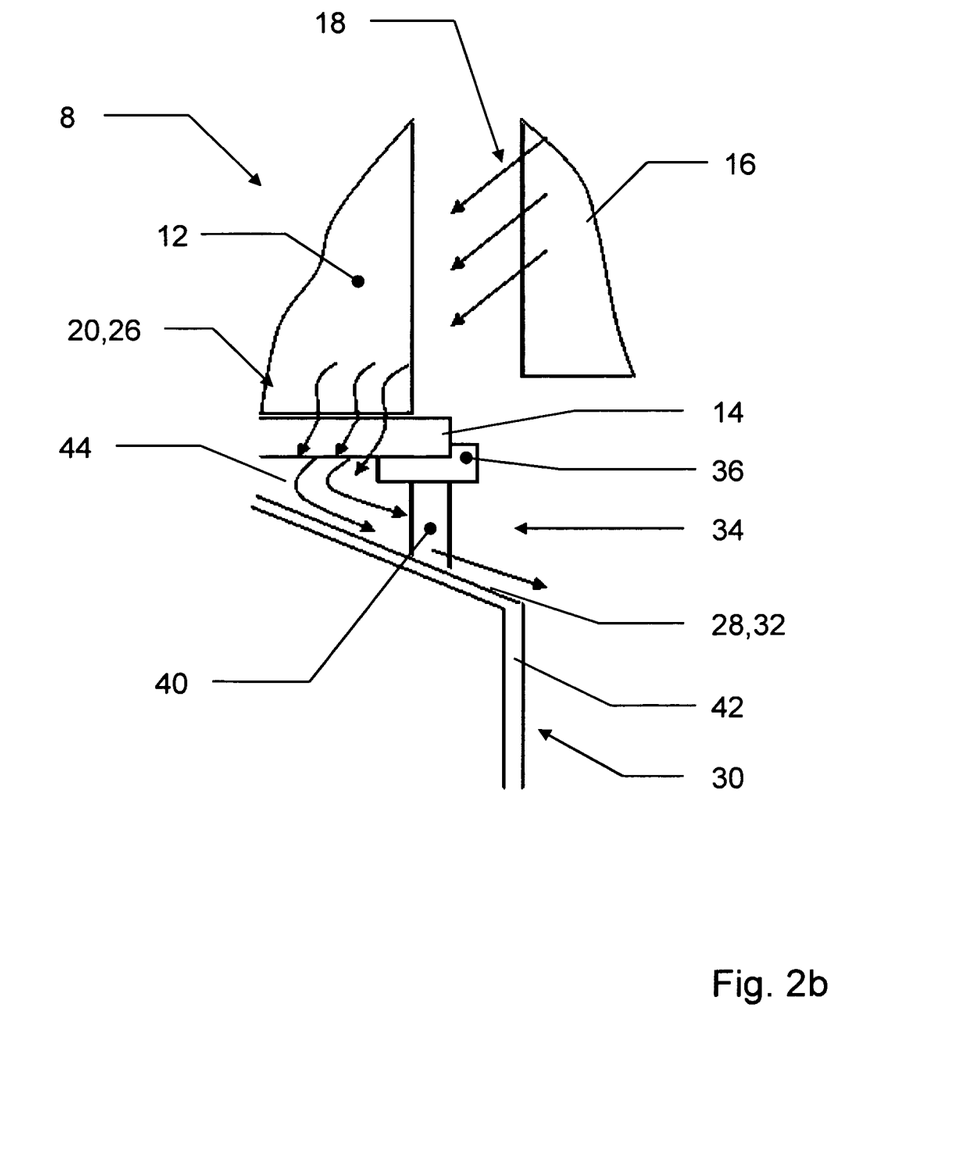
Figure 2C:
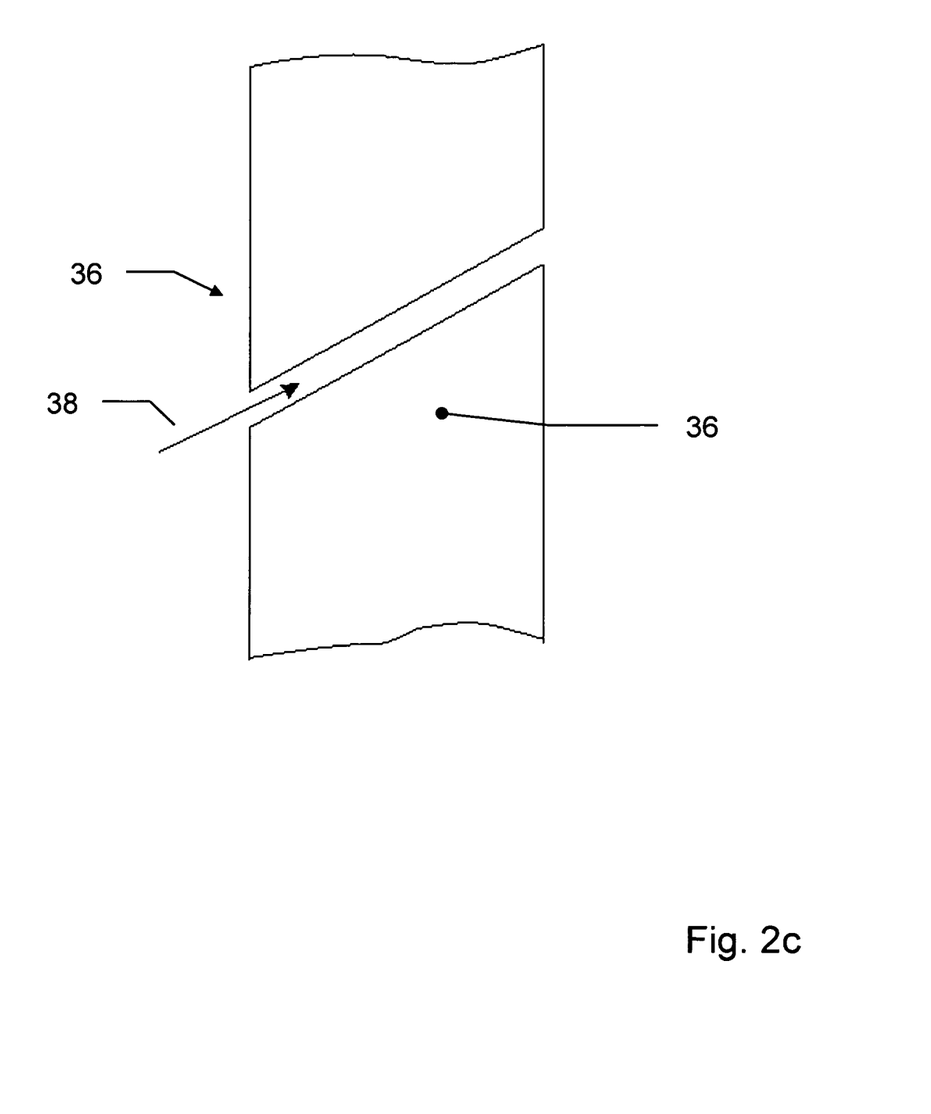

The schematic representation of FIGS. 2a, 2b and 2c show in three different views a first embodiment of a transport- and drying device 8 according to the present invention. According to FIG. 2a a continuous line 10 of bottles 12 to be tried are transported directly one behind the other on a conveying chain 14, whereby the bottles are touching each other or are spaced apart by a small gap. The bottles 12 are transported by the conveying chain 14 after passing a filling station and consecutively being capped. According to the invention the conveying chain 14 shows an open structure. In the transport- and drying device 8 the bottles 12 shall be dried and stuck liquid or humidity should be removed as completely as possible so that disturbances in the following treatment due to residual moisture can be avoided. These following treatments can for example comprise labeling or printing or something alike. The schematic representation also shows blowing devices 16 arranged on the left and the right side close to the bottles 12 that are transported in a horizontal direction. The blowing devices 16 can for example be formed by nozzle arrays, flat nozzles or something alike. The air flow 18 coming from the blowing device 16 is usually directed obliquely downwards as pointed out in FIG. 2b by parallel arrows to the right and left of the bottles 12. The representation of FIG. 2b shows an enlarged detail B, of a section marked with a circle in FIG. 2a.

The conveying chain 14 forming the link conveyor forms an almost planar, moving support plane for the bottles 12 standing on the upper side of the link conveyor. The bottles 12 get thereby blown with dry air 18 coming from the sides or from above. According to the invention the conveying chain 14 is at least partially permeable for the dry air 18; therefore the removed humidity is drained down below through the upper side of the link conveyor or conveying chain 14. Flow conducting surfaces 28 for draining the humid drying air 18 carrying the liquid of the bottles 12 to be dried are arranged below the conveying chain 14. As indicated in FIG. 2a the flow conducting surfaces 28 are part of an enclosure 30 for the section of the conveying chain 14 returning below the support plane for the bottles 12. This part is called lower returning strand 24. The enclosure 30 shows a roof shaped upper side, whereby the surfaces 32 inclining downwards function as flow conducting surfaces 28 and as support surfaces for the distance elements 34 carrying the conveying chain 14 as well. The enclosure 30 is an encasing closed at its upper side so that the moisture blown down below cannot get back to the returning lower strand 24 of the conveying chain 14 and cannot be fed back to the newly incoming bottles 12.

The distance elements as shown in FIGS. 2a and 2b are formed out of several parts. Two flat sliding bars or rails 36 form the edges of the bilateral support for the conveying chain 14. The two parallel sliding bars or rails 36 are spaced apart from each other according to the width of the conveying chain 14. The sliding bars or rails 36 are preferably interrupted at multiple places as shown in FIG. 2c. Several separation points 38 can be arranged at short distances from each other, especially the separation points 38 are arranged transverse to the longitudinal direction of the sliding bars or rails 36. This arrangement leads to very low resistance for the humidity draining down below. The sliding bars or rails 36 are supported by a plurality of preferably regular spaced support columns 40 that are supported on the inclining surfaces 32 of the enclosure 30. The enclosure 30 shown in FIG. 2a shows symmetric features whereby the inclining surfaces 32 on both sides have the same length and incline in the same angle. The angle of inclination can for example be between 5° to 25°. The inclining surfaces 32 are connected with vertical lateral areas 42 of the enclosure 30. The two inclining surfaces 32 meet centrally below the middle of the conveying chain 14 in a ridge or bend. Preferably at least two support columns 40 are arranged between each of the separation points 38 of each sliding bar or rail 36 to form a stable substructure for the conveying chain 14. The support columns 40 for example show a cylindrical cross-section with a diameter of about 10 mm. According to the requirement the sliding bars or rails 36 can show a width of about 10 mm to 40 mm and a thickness of about 5 mm to 20 mm.

As shown in the embodiment there is sufficient space between the conveying chain 14 and the flow conducting surfaces 28 as well as the enclosure 30. Therefore as shown by the flow pattern 44 represented in FIG. 2b the moisture can be drained almost completely unimpeded through the conveying chain 14 and the sliding bars or rails 36 and the support columns 40. At the same time the inner space of the enclosure 30 between the surface areas 32 and the vertical lateral sides 42 as well as the returning lower strand 24 guided in the enclosure are optimally shielded from the flow pattern 44 and the moisture carried by or contained in this air.

Figure 3A:
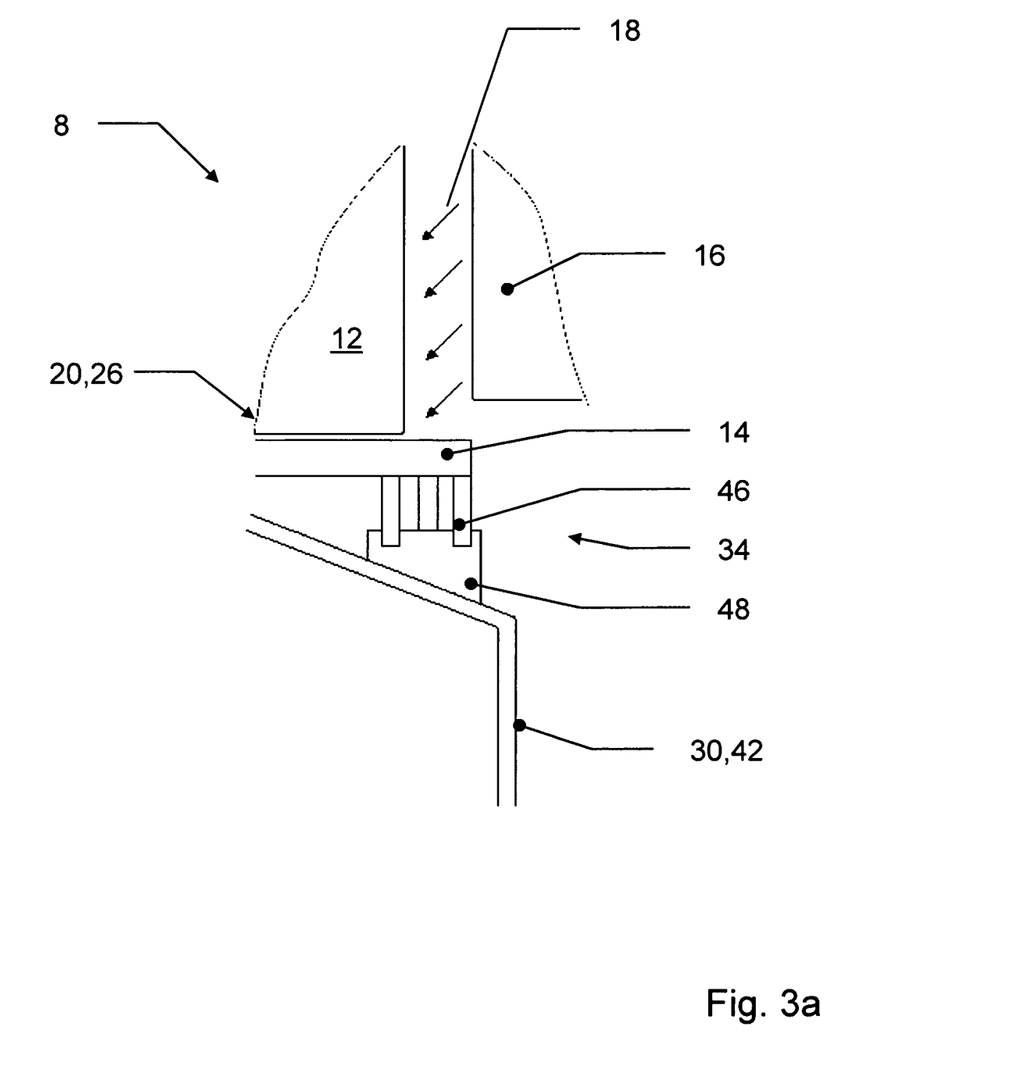
FIGS. 3a and 3b show two views of an alternative embodiment of the transport- and drying device.
Figure 3B:
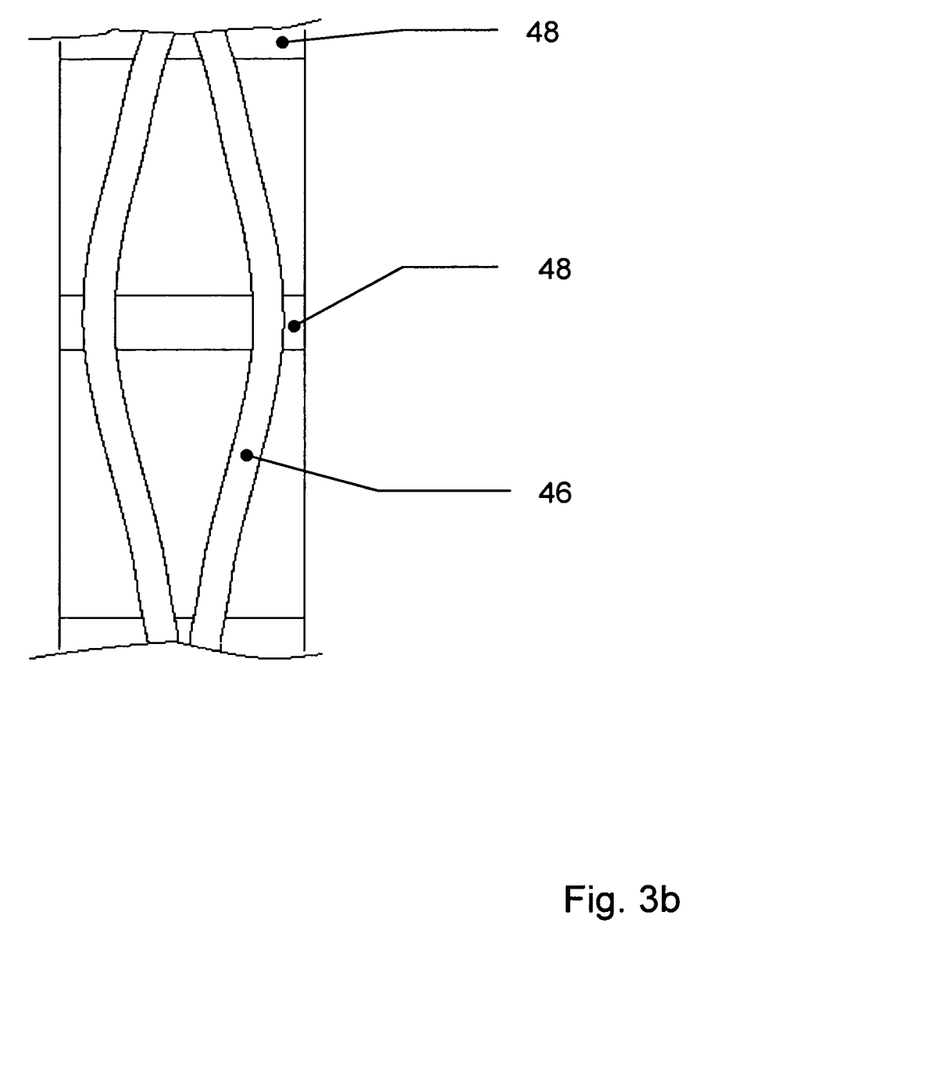

The representations of FIGS. 3a and 3b show two views of an alternative embodiment of the transport- and drying device 8. Especially the distance elements 34 are formed differently compared to the embodiment shown in FIG. 2. Meanwhile the sliding bars or rails 36 shown in FIG. 2 are relatively flat but broad, the embodiment shown in FIG. 3 features four sliding bars or rails 46 arranged pair wise at the edges of the conveying chain 14 in an upright arrangement. The detailed representation of FIG. 3a shows just one side of the distance elements 34. As shown in FIG. 3b the pair wise arranged sliding bars or rails 46 can show a meandering course. Optionally they can be interrupted at multiple and/or regular distances in transverse direction. A meandering course describes an opposing regular enlargement and reduction of the distance between the two sliding bars or rails 46 of each pair. The lower flat sides of the sliding bars or rails 46 are supported on bridge like clamping units 48. The lower side of the clamping units 48 is customized to the tapered outline of the enclosure 30 and provides a steady support for the sliding bars or rails 46. For logical reasons clamping units 48 for the rest and the support of each pair of sliding bars or rails 46 should be provided at places with the widest and places with the smallest distance between the sliding bars or rails 46 (see FIG. 3b).

In this embodiment the conveying chain 14 again shows a sufficient distance to the flow conducting surfaces 28 as well as to the enclosure 30. This ensures the desired flow pattern 44 whereby the humidity is drained almost without any hindrance between the conveying chain 14, between the sliding bars or rails 46 and between the clamping units 48. At the same time the inner space of the enclosure 30 between the surfaces 32 and the vertical lateral sides 42 as well as the lower returning strand 24 of the conveying chain 14 guided within the enclosure 30 are shielded optimally from the flow pattern 44 carrying the drained humidity.

LIST OF REFERENCE SYMBOLS 8 transport and drying device
10 line
12 bottle
14 conveying chain
16 blowing device
18 air flow
20 bottle bottom
22 swirled air
24 lower/returning strand
26 upper side
28 flow conducting surface
30 enclosure
32 surface area
34 distance element
36 sliding bar or rail
38 separation point
40 support column
42 vertical lateral side
44 flow pattern
46 sliding bar or rail (pair wise)
48 clamping unit

What is claimed is:

1. A transport and drying device for individual articles, a grouped plurality of articles and/or a plurality of articles transported in a row and/or side by side, the articles at least partially showing humidity and/or liquid drops on their outer surface, the device comprising:
   a link conveyor, the articles standing on the link conveyor in an airflow of drying air, the link conveyor forming a mostly planar, moving support plane for the articles, the support plane being at least partially permeable for the drying air flow;
   flow conducting surfaces arranged at a lower surface of the support plane for the drainage of the humid drying air carrying the liquid removed from the articles to be dried;
   distance elements supporting a section of the link conveyor supporting the articles, the distance elements being placed on an upper side of the flow conducting surfaces or an enclosure having the flow conducting surfaces, the enclosure defining a roof shaped upper side, the surfaces of the upper side inclining downwards so as to define the flow conducting surfaces as well as support surfaces for the distance elements supporting the link conveyor, at least one sliding rail being supported by the distance elements, the at least one sliding rail being located on the distance elements,
   wherein the sliding rail is straight or meandering in longitudinal direction and wherein the sliding rail is interrupted at multiple and/or regular distances in a transverse direction.

2. The transport- and drying device as recited in claim 1 wherein the flow conducting surfaces are part of an enclosure shielding a section of the link conveyor returning below the support plane for the articles.

3. The transport- and drying device as recited in claim 1 wherein the link conveyor is spaced apart from the flow conducting surfaces or an enclosure having the flow conducting surfaces.

* * * * *